United States Patent
More et al.

(10) Patent No.: US 9,436,412 B2
(45) Date of Patent: Sep. 6, 2016

(54) PREEMPTIVE CONNECTION SWITCHING FOR SERIAL ATTACHED SMALL COMPUTER SYSTEM INTERFACE SYSTEMS

(71) Applicant: LSI CORPORATION, San Jose, CA (US)

(72) Inventors: Shankar T. More, Pune (IN); Vidyadhar Pinglikar, Pune (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 538 days.

(21) Appl. No.: 13/970,991

(22) Filed: Aug. 20, 2013

(65) Prior Publication Data
US 2014/0258572 A1 Sep. 11, 2014

(30) Foreign Application Priority Data
Mar. 8, 2013 (IN) .............................. 1005CHE2013

(51) Int. Cl.
*G06F 13/18* (2006.01)
*G06F 3/06* (2006.01)
*G06F 13/16* (2006.01)
*G06F 13/40* (2006.01)

(52) U.S. Cl.
CPC ......... *G06F 3/0689* (2013.01); *G06F 13/1605* (2013.01); *G06F 13/18* (2013.01); *G06F 13/4022* (2013.01)

(58) Field of Classification Search
CPC ...... G06F 13/36; G06F 13/374; G06F 13/18; G06F 13/1605
USPC ........................................................ 710/244
See application file for complete search history.

(56) References Cited

U.S. PATENT DOCUMENTS

| | | | |
|---|---|---|---|
| 7,584,319 B1 | 9/2009 | Liao et al. | |
| 7,958,295 B1 | 6/2011 | Liao et al. | |
| 8,095,722 B1 | 1/2012 | Liao et al. | |
| 8,843,671 B1* | 9/2014 | Tabor ...................... | G06F 3/061 710/15 |
| 2007/0220204 A1* | 9/2007 | Nakajima ............. | G06F 3/0607 711/114 |
| 2008/0040564 A1 | 2/2008 | Kubo et al. | |
| 2008/0162773 A1 | 7/2008 | Clegg et al. | |
| 2013/0198465 A1* | 8/2013 | Suzuki ............... | G06F 13/1605 711/158 |
| 2014/0143464 A1* | 5/2014 | Natrajan ............. | G06F 13/4027 710/117 |
| 2014/0244879 A1* | 8/2014 | Myrah .................. | G06F 13/409 710/300 |

* cited by examiner

*Primary Examiner* — Glenn A Auve (57) ABSTRACT

Methods and structure for preemptively terminating Serial Attached Small Computer System Interface connections are provided. One exemplary embodiment includes an expander comprising multiple physical links, switching circuitry able to establish connections between end devices coupled with the expander through the physical links, and a connection manager. The connection manager is able to process an Open Address Frame from an end device, and to determine that the Open Address Frame requests a connection through a physical link that is already servicing an established connection. The connection manager is further able to determine that the Open Address Frame requests a higher priority connection than the established connection, and to direct one of the end devices utilizing the established connection to terminate the established connection based on the higher priority.

20 Claims, 7 Drawing Sheets

| BYTE | BIT | 7 | 6 | 5 | 4 | 3 | 2 | 1 | 0 |
|---|---|---|---|---|---|---|---|---|---|
| | 0 ⋮ 23 | INIITIATOR CONNECTION TAG, ETC. ||||||||
| | 24–27 | PRIORITY INFORMATION ||||||||
| | 28–31 | CYCLIC REDUNDANCY CHECK ||||||||

PREEMPTIVE CONNECTION SWITCHING FOR SERIAL ATTACHED SMALL COMPUTER SYSTEM INTERFACE SYSTEMS

CROSS REFERENCE TO RELATED APPLICATIONS

This document claims priority to Indian Patent Application Number 1005/CHE/2013 filed on Mar. 8, 2013 (entitled PREEMPTIVE CONNECTION SWITCHING FOR SERIAL ATTACHED SMALL COMPUTER SYSTEM INTERFACE SYSTEMS) which is hereby incorporated by reference

FIELD OF THE INVENTION

The invention relates generally to Serial Attached Small Computer System Interface (SAS) systems, and more specifically to enhancing communications in SAS systems.

BACKGROUND

In SAS systems, connections between end devices can be established via SAS expanders. When a SAS expander establishes a connection between end devices, physical links/transceivers (PHYs) of the expander become occupied. Those PHYs cannot serve new connections until the current connection is closed. Thus, if an expander is already servicing a connection between end devices, a higher priority connection may be effectively blocked until the lower priority connection is completed.

SUMMARY

Systems and methods herein allow for preemptive termination of connections between end devices in a SAS environment. This means that lower priority connections can be terminated in order to free up resources for higher priority SAS connections.

One exemplary embodiment includes an expander comprising multiple physical links, switching circuitry able to establish connections between end devices coupled with the expander through the physical links, and a connection manager. The connection manager is able to process an Open Address Frame from an end device, and to determine that the Open Address Frame requests a connection through a physical link that is already servicing an established connection. The connection manager is further able to determine that the Open Address Frame requests a higher priority connection than the established connection, and to direct one of the end devices utilizing the established connection to terminate the established connection based on the higher priority. Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
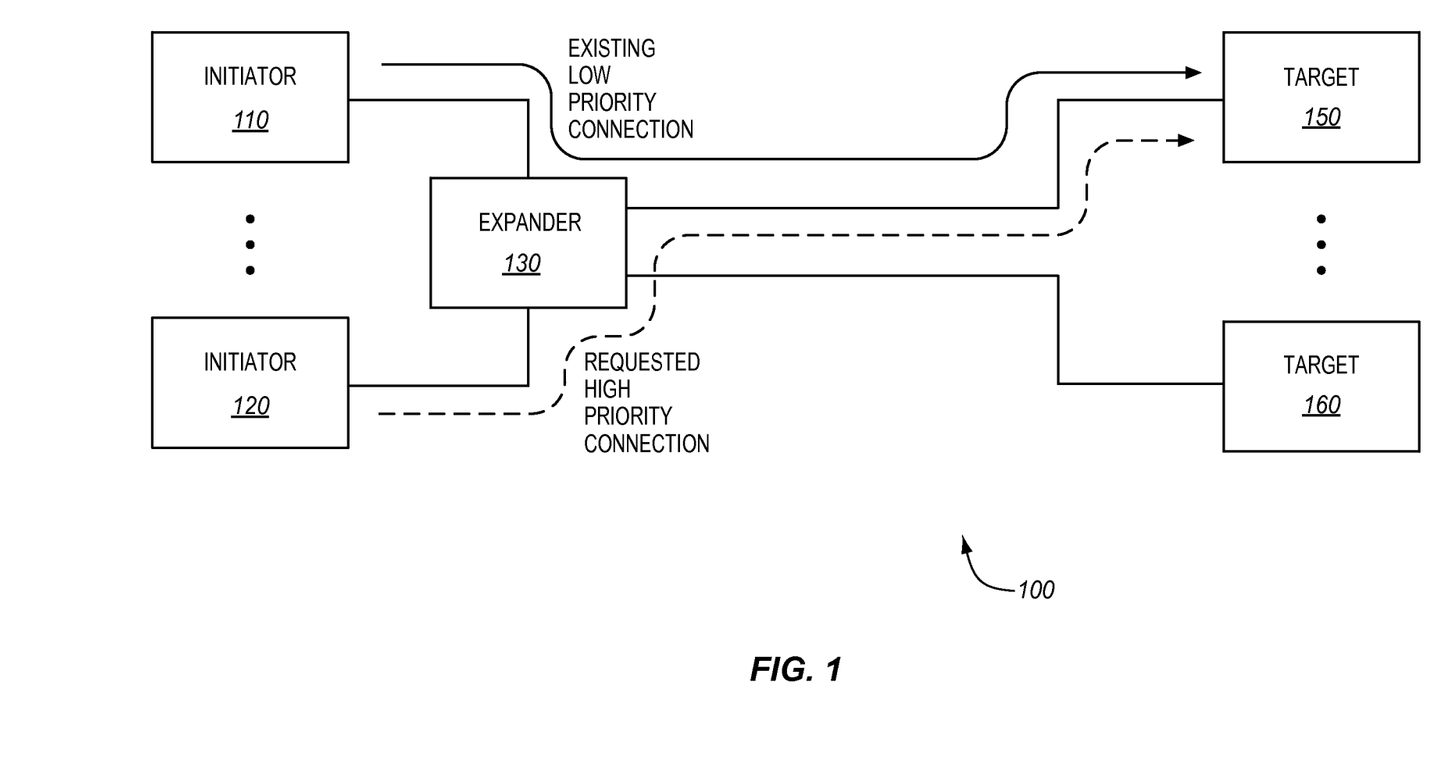
FIG. 1 is a block diagram of an exemplary Serial Attached Small Computer System Interface (SAS) architecture 100.

FIG. 1 is a block diagram of an exemplary SAS architecture 100. SAS architecture 100 establishes connections between initiators and targets (known collectively as "end devices") in order to enable Input/Output (I/O) operations between those devices. In this embodiment, SAS architecture 100 includes SAS initiators 110 and 120 which are coupled via expander 130 to targets 150 and 160.

SAS architecture 100 has been enhanced so that existing/current connections between SAS end devices can be preemptively terminated if they are blocking higher priority connections that have been requested. Furthermore, SAS architecture 100 can perform the preemptive closure of lower priority connections without generating errors or I/O faults.

SAS initiators 110 comprise any suitable systems, devices, or components that are compliant with Serial Attached Small Computer System Interface (SAS) and/or Serial Advanced Technology Attachment (SATA) protocols such as Serial SCSI Protocol (SSP), SATA Tunneling Protocol (STP), Serial Management Protocol (SMP), etc. For example, in one embodiment SAS initiators 110 and 120 comprise Host Bus Adapters (HBAs) that are SAS-compliant. SAS initiators 110 and 120 establish connections with target devices 150 and 160 through expander 130. Target devices 150 and 160 comprise any SAS and/or SATA compliant target devices, such as storage devices (e.g., disk drives, etc.).

Expander 130 comprises any suitable device capable of routing commands between end devices in accordance with SAS protocols. Specifically, expander 130 includes multiple different PHYs that each may be coupled with a different end device. Therefore, expander 130 establishes connections between the end devices by coupling different pairs of its PHYs together.

While only one expander is shown in FIG. 1, any number of expanders or similar routing elements may be combined to form a "switched fabric" of interconnected elements between initiators and targets in SAS architecture 100. Furthermore, the particular arrangement, number, and configuration of components described herein with regard to FIG. 1 is exemplary and non-limiting.

Figure 2:
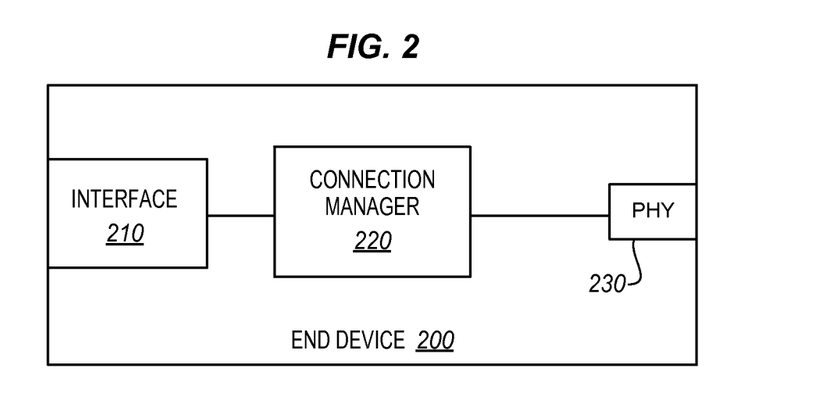
FIG. 2 is a block diagram of an exemplary end device.

FIG. 2 is a block diagram of an exemplary end device 200 (e.g., a SAS initiator or a SAS/SATA target). According to FIG. 2, end device 200 includes an interface 210, a connection manager 220, and a physical link/transceiver (PHY) 230. In embodiments where end device 200 is an initiator, interface 210 may be used to communicate with a host system. In embodiments where end device 200 is a target device, interface 210 may be used to direct the operations of storage media or other circuitry components. Connection manager 220 of end device 200 is able to manage existing connections with other end devices. For example, connection manager 220 may generate Open Address Frame primitives (OAFs), End of Frame primitives (EOFs), Data Frames, etc. in order to communicate with connected devices. PHY 230 is used as an interface by connection manager 220 in order to transmit and receive communications for other end devices. Connection manager 220 may be implemented as custom circuitry, as a processor executing programmed instructions stored in program memory, or some combination thereof.

Figure 3:
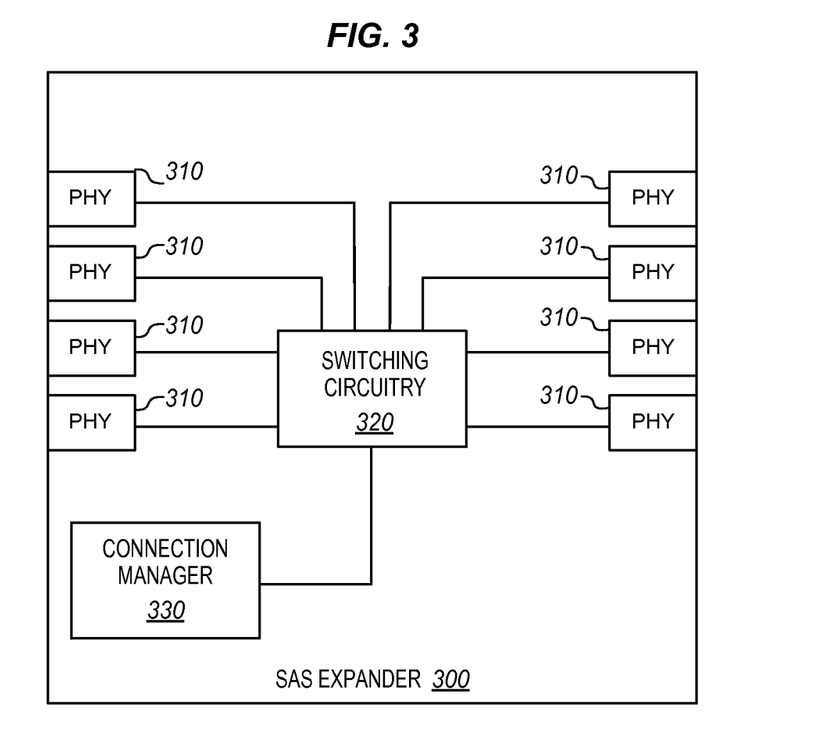
FIG. 3 is a block diagram of an exemplary SAS expander.

FIG. 3 is a block diagram of an exemplary SAS expander 300. According to FIG. 3, SAS expander 300 includes multiple internal PHYs 310 that may be coupled with each other via switching circuitry 320 (e.g., a crossbar switch). Connection manager 330 (e.g., an Expander Connection Manager (ECM)) manages the operations of switching circuitry 320 in order to establish and break down connections between end devices. Connection manager 330 may further include routing tables or other information for determining which PHYs 310 to use in order to establish connections between different end devices. Connection manager 330 may be implemented as custom circuitry, as a processor executing programmed instructions stored in program memory, or some combination thereof.

While in operation, SAS architecture 100 is operable to selectively preempt (or "close") connections between end devices in order to allow higher priority connections to be established more quickly. Further details of the operation of SAS architecture 100 will be described with reference to method 400 of FIG. 4.

Figure 4:
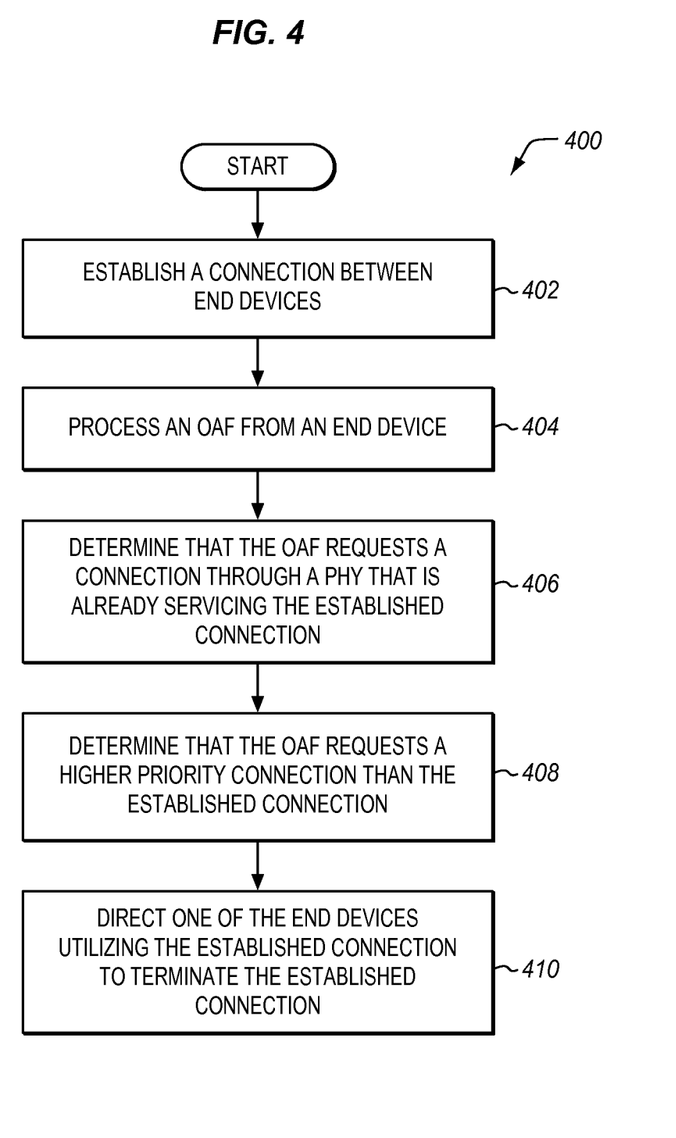
FIG. 4 is a flowchart describing an exemplary method for preemptively closing an existing SAS connection.

FIG. 4 is a flowchart describing an exemplary method 400 for preemptively closing an existing SAS connection. According to FIG. 4, in step 402 expander 130 establishes a connection between two end devices. Here, assume that the connection is between initiator 110 and target 150. As a part of establishing the connection, switching circuitry at expander 130 connects the internal PHY of expander 130 that is coupled with initiator 110 to the internal PHY of expander 130 that is coupled with target 150. This newly established connection may then be used to transfer I/O data between initiator 110 and target 150.

In step 404, expander 130 receives an Open Address Frame (OAF) from a new end device and processes the OAF. Processing the OAF can include determining the destination and source address of the OAF. In this embodiment, the new end device is initiator 120, and the OAF requests a connection with target 150.

In step 406, a connection manager of SAS expander 130 determines that the OAF is requesting a connection through a PHY that is already servicing the current, established connection. Specifically, the requested connection would use the PHY that is already coupled with target 150 and servicing the established connection with initiator 110. This means that the PHY is busy and therefore unavailable to form a new connection until the current connection is closed.

In step 408, the connection manager of expander 130 determines that the OAF requests a higher priority connection than the current connection. This may be performed by reading priority information from the OAF itself, and comparing it to priority information for the current connection. In one embodiment, the priority information is stored in a tag or vendor-specific field of the OAF.

In step 410, having determined that a higher priority connection is waiting on a lower priority connection, the connection manager of expander 130 directs one of the end devices utilizing the current connection (e.g., initiator 110) to terminate the current connection. For example, expander 130 may transmit a specialized primitive to initiator 110. From this point, the end device that receives the specialized primitive (e.g., initiator 110) may terminate the current connection.

Even though the steps of method 400 are described with reference to SAS architecture 100 of FIG. 1, method 400 may be performed in other systems that utilize SAS components. The steps of the flowcharts described herein are not all inclusive and may include other steps not shown. The steps described herein may also be performed in an alternative order.

EXAMPLES

In the following examples, additional processes, systems, and methods are described in the context of a SAS architecture that utilizes Fast Context Switching (FCS) techniques.

Figure 5:
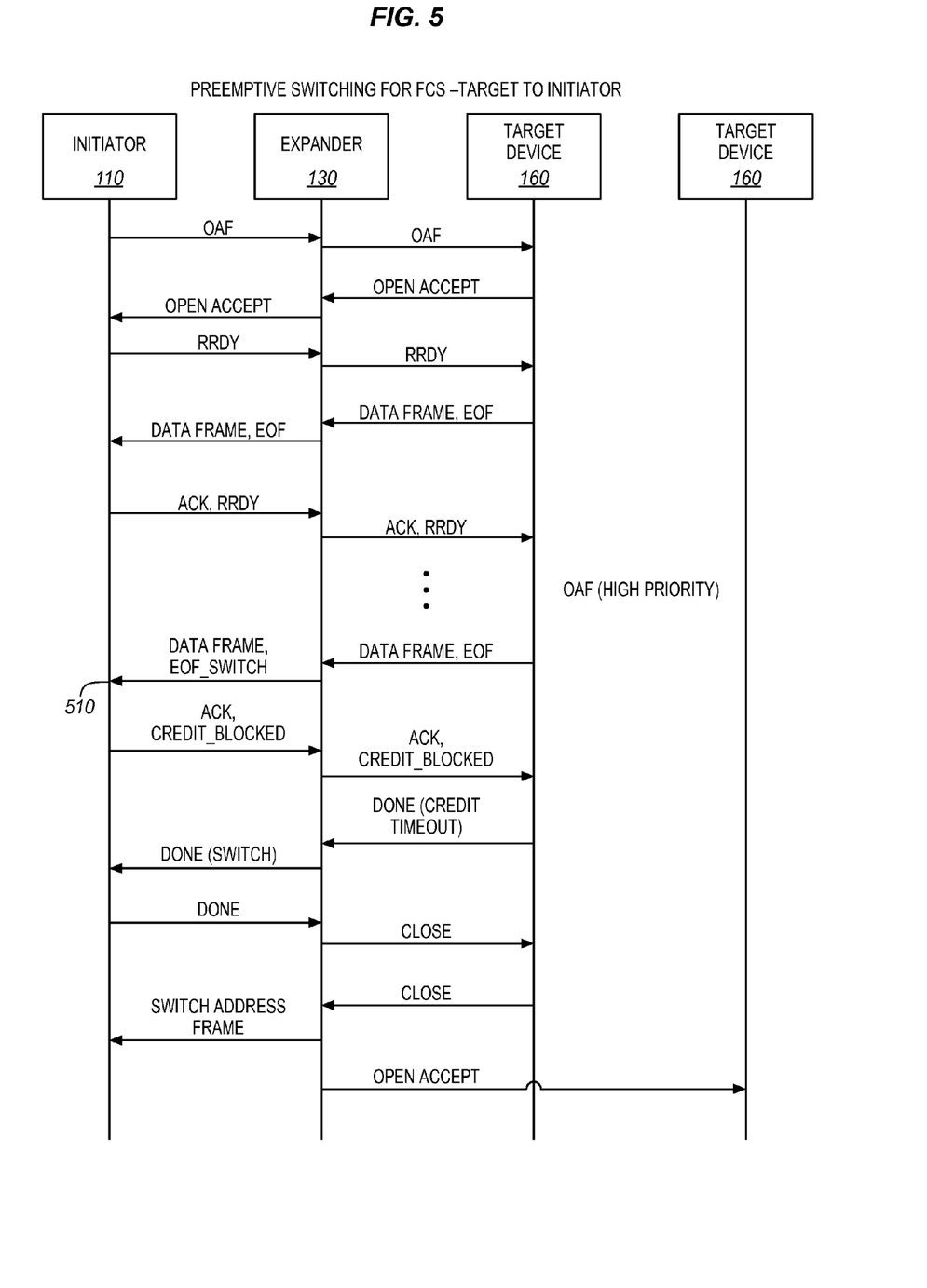
FIG. 5 is a message diagram illustrating communications between SAS devices in an exemplary embodiment.

FIG. 5 is a message diagram illustrating communications between SAS devices in an exemplary embodiment. According to FIG. 5, a message diagram is shown where an existing connection between initiator 110 and target device 150 (e.g., a connection that is used to read data from target device 150) is serviced and then preemptively closed. This allows a higher priority connection between initiator 110 and target device 160 to be serviced.

The message diagram of FIG. 5 shows that initiator 110 first establishes a connection with target device 150 by sending an OAF to target device 150 through expander 130. During this process, a connection manager of expander 130 connects an internal PHY for communicating with initiator 110 to an internal PHY for communicating with target device 150. Expander 130 then forwards the OAF through the established connection to target device 150. Target device 150 then responds with an OPEN_ACCEPT primitive, which completes the establishment of a SAS connection between the devices.

Once the connection is established between initiator 110 and target device 150, the two devices are ready to exchange data. Therefore, initiator 110 sends target device 150 one or more Receive Ready (RRDY) primitives that permit target device 150 to transmit one or more frames of data. RRDY primitives are examples of flow control credits. Target device 150 then transmits the number of allowed data frames, and ends each data frame with an End Of Frame (EOF) primitive. Initiator 110 provides Acknowledgment (ACK) primitives for each data frame that has been successfully received, and may issue further RRDY primitives to allow target device 150 to send out more data frames.

The iterative process described above continues until a new OAF is received from target device 160 that requests a connection with initiator 110. The PHY at expander 130 that is used to connect with initiator 110 is busy, because it is managing the current connection between initiator 110 and target device 150. Thus, in normal SAS systems, target device 160 would have to wait until the current connection with SAS initiator 110 completed of its own accord.

However, expander 130 includes an enhanced connection manager that is able to review the OAF and determine that the OAF is for a high priority connection. Therefore, expander 130 manipulates the ongoing communications between initiator 110 and target 150 to trigger preemptive termination of the current connection. Here, a connection manager of expander 130 "snoops" communications between the two end devices, and replaces an EOF primitive with a vendor-specific EOF_SWITCH primitive at 510. The EOF_SWITCH primitive is then received by initiator 110. Based on priority information in the EOF_SWITCH primitive, initiator 110 determines that a high priority connection is currently waiting for the existing connection to complete. Initiator 110 determines that the current connection is a lower priority connection than the requested connection, and therefore proceeds to preemptively terminate the existing connection between initiator 110 and target device 150.

In order to terminate the connection, initiator 110 refrains from sending any additional RRDY primitives, which effectively prevents target device 150 from sending more data frames. Furthermore, initiator 110 sends a CREDIT_BLOCKED primitive to target 150, in order to indicate that no more RRDYs are going to be transmitted during this connection (i.e., the flow control credit is not going to be increased). After target 150 has exhausted its remaining available flow control credits, it will not wait for new flow control credits along the current connection. Instead, target 150 will immediately initiate connection closure This results in target device 150 sending a DONE (CREDIT TIMEOUT) primitive to initiator 110, which is replaced by expander 130 with a Fast Context Switching (FCS) DONE(SWITCH) primitive. Then, in accordance with FCS, part of the existing connection is then locally closed between expander 130 and target 150, and the remaining partial connection is reused to establish a connection between initiator 110 and target device 160 (e.g., by use of an FCS Switch Address Frame). An OPEN ACCEPT is then sent from initiator 110 to target 160 to establish the new, higher priority connection between initiator 110 and target 160.

Figure 6:
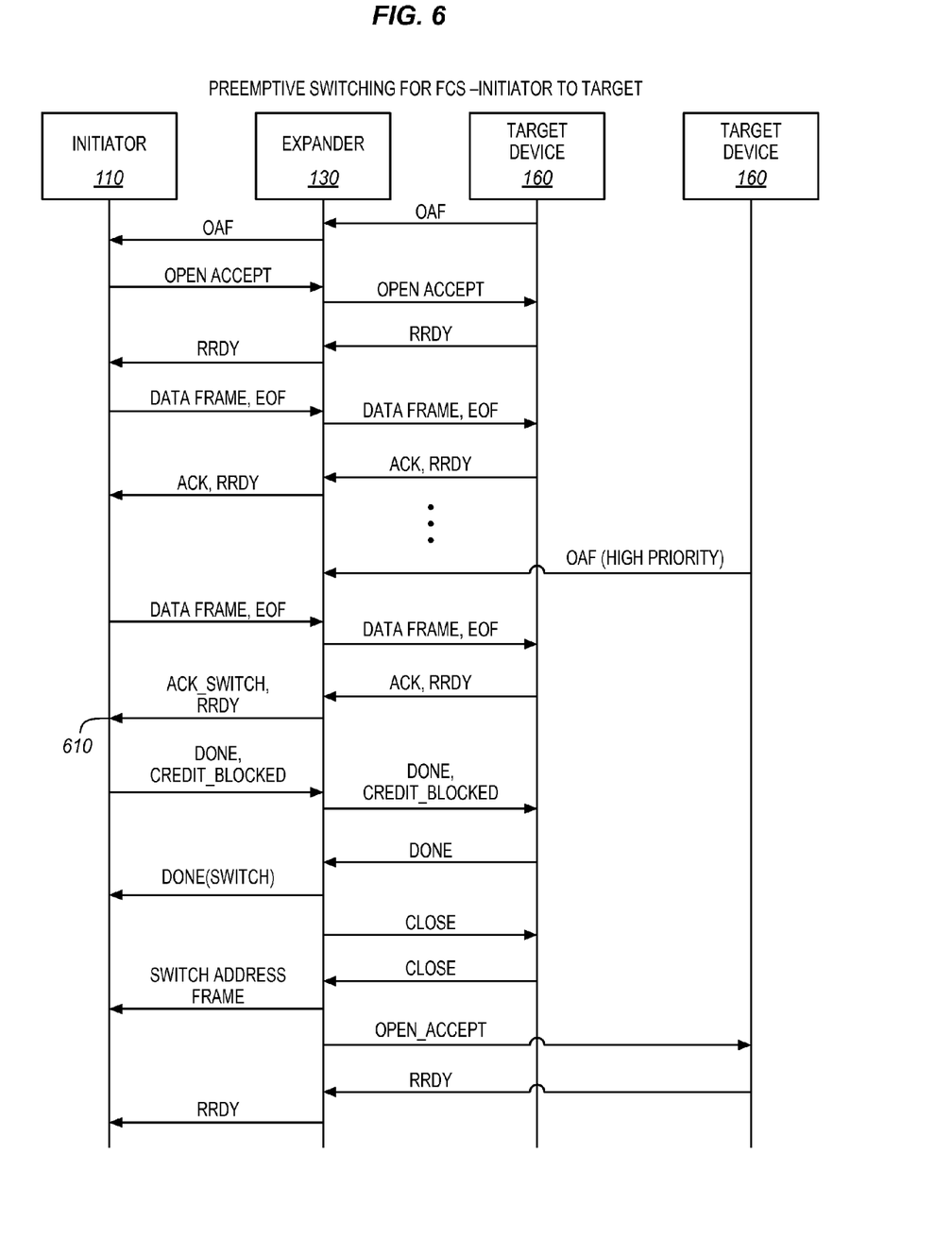
FIG. 6 is a message diagram illustrating further communications between SAS devices in an exemplary embodiment.

FIG. 6 is a message diagram illustrating further communications between SAS devices in an exemplary embodiment. FIG. 6 differs from FIG. 5 in that data is being transferred from initiator 110 to target device 150 (e.g., in order to write data to target device 150), instead of from target device 150 to initiator 110.

In FIG. 6, a connection between initiator 110 and target device 150 is first established. Then, data frames, EOFs, ACKs, and RRDYs are exchanged between the two devices to exchange data. However, when a connection manager of expander 130 receives a new, high priority OAF (i.e., for a connection via a PHY that is already in use), the connection manager operates differently.

Here, instead of replacing an EOF primitive with an EOF_SWITCH primitive, the expander replaces an ACK with an ACK_SWITCH primitive (which indicates that a high priority OAF is waiting at an expander in the given connection path) at 610. Thus, regardless of whether initiator 110 is reading data (as in FIG. 5) or is writing data (as in FIG. 6), initiator 110 receives a primitive which tells it that a high priority connection is waiting. Therefore, initiator 110 can immediately send CREDIT_BLOCKED and DONE primitives to target device 150 in order to close/reuse the connection in a similar manner to that described with regard to FIG. 5.

While FIGS. 5-6 describe high priority connections that are requested by target devices in order to communicate with initiators, the principles described above can be applied to requests sent by any suitable end devices.

Figure 7:
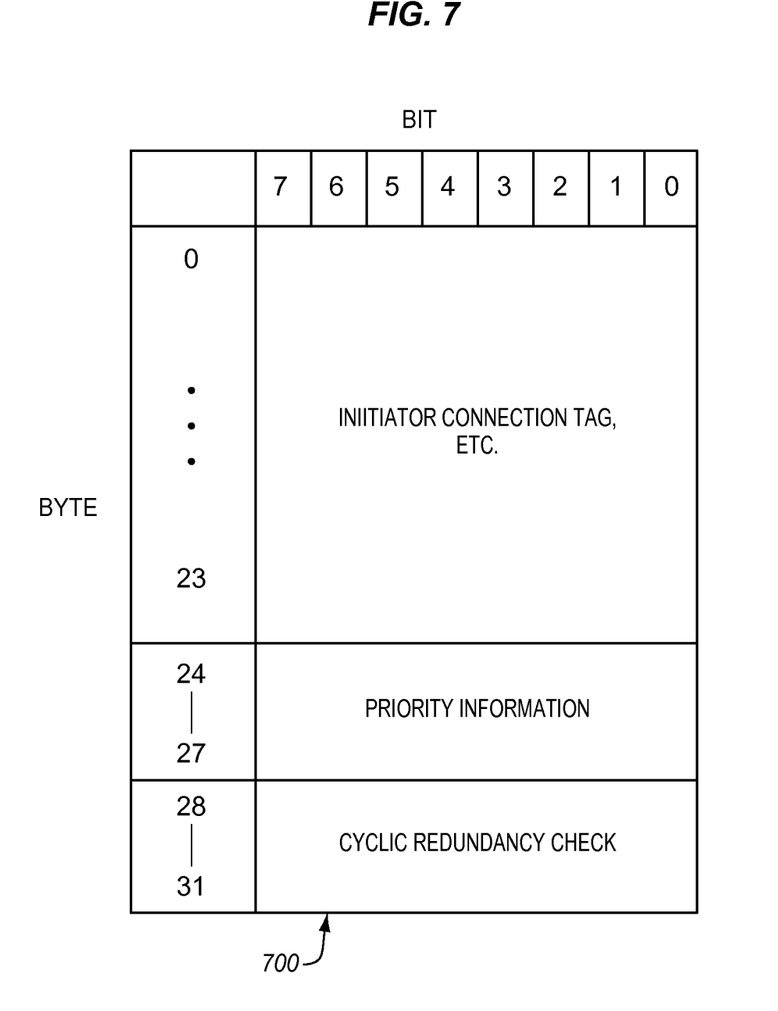
FIG. 7 is a block diagram of an exemplary Open Address Frame that includes priority information.

FIG. 7 is a block diagram of an exemplary Open Address Frame (OAF) 700 that includes priority information. According to FIG. 7, OAF 700 maintains priority information as a multi-bit field occupying bytes 24-27. Thus, many levels of priority may be defined for different OAFs in this embodiment. In one embodiment, each of the new primitives discussed above (e.g., EOF_SWITCH and ACK_SWITCH) are implemented as 32 bit DWORD codes.

Figure 8:
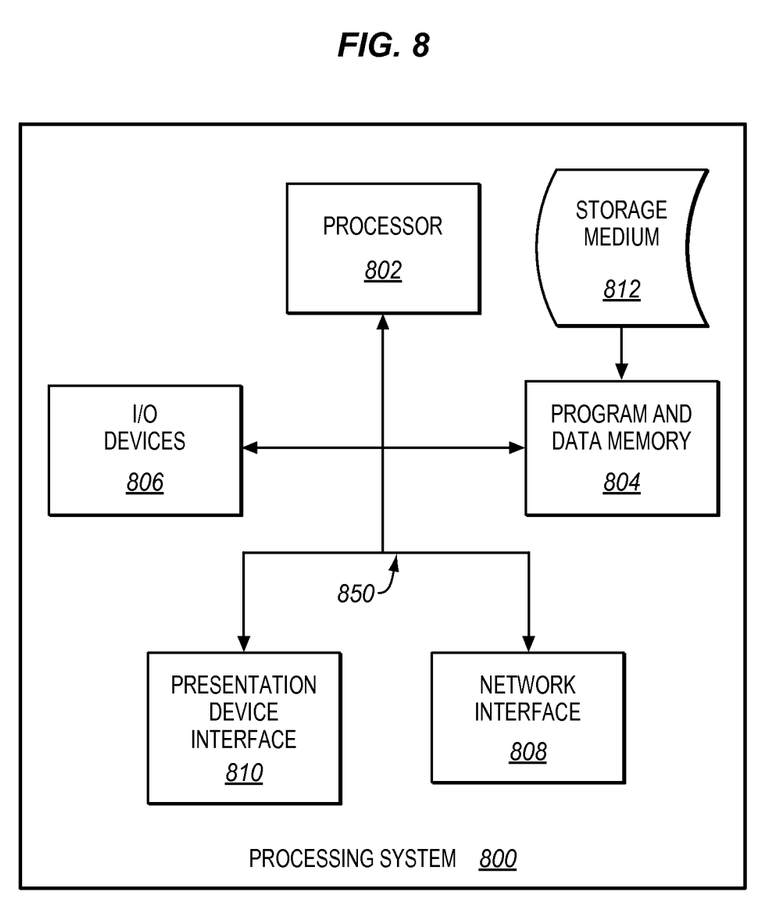
FIG. 8 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of SAS architecture 100 (e.g., a SAS initiator and/or a SAS expander) to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer or any other instruction execution system (e.g., processing system 800). For the purposes of this description, computer readable storage medium 812 can be anything that can contain or store the program for use by the computer (e.g., processing system 800).

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

What is claimed is:

1. A Serial Attached Small Computer System Interface (SCSI) expander, comprising:
multiple physical links;
switching circuitry operable to establish connections between end devices coupled with the SCSI expander through the physical links; and
a connection manager operable to process an Open Address Frame from an end device, to determine that the Open Address Frame requests a connection through a physical link that is already servicing an established connection, to determine that the Open Address Frame requests a higher priority connection than the established connection, and to direct one of the end devices utilizing the established connection to terminate the established connection based on the higher priority connection.

2. The (SCSI) expander of claim 1, wherein:
the connection manager is further operable to intercept an End Of Frame primitive directed to an initiator along the established connection, and to replace the End Of Frame primitive with a different primitive for transmission to the initiator in order to terminate the established connection.

3. The (SCSI) expander of claim 2, wherein:
the different primitive comprises an End Of Frame Switch primitive that indicates the higher priority connection has been requested.

4. The (SCSI) expander of claim 1, wherein:
the connection manager is further operable to intercept an Acknowledge primitive directed to an initiator along the established connection, and to replace the Acknowledge primitive with a different primitive for transmission to the initiator in order to terminate the established connection.

5. The (SCSI) expander of claim 4, wherein:
the different primitive comprises an Acknowledge Switch primitive that indicates the higher priority connection has been requested.

6. A Serial Attached Small Computer System Interface end device comprising:
a physical link; and
a connection manager operable to establish a connection with another end device via the physical link, to process a notification along the established connection indicating that a higher priority connection is waiting on the established connection, and to terminate the established connection in response to receiving the notification.

7. The end device of claim 6, wherein:
the notification comprises a primitive that replaces an End Of Frame primitive and indicates that the higher priority connection has been requested.

8. The end device of claim 6, wherein:
the notification comprises a primitive that replaces an Acknowledge primitive and indicates that the higher priority connection has been requested.

9. The end device of claim 6, wherein:
the connection manager is further operable to terminate the established connection by halting issuance of flow credits to the another end device.

10. The end device of claim 9, wherein:
halting the issuance of flow credits to the another end device comprises halting issuance of Receiver Ready primitives to the another end device.

11. The end device of claim 6, wherein:
the connection manager is further operable to initiate the termination of the established connection by transmitting a CREDIT_BLOCKED primitive to the another end device.

12. A method for operating a Serial Attached Small Computer System Interface architecture, the method comprising:
establishing, via a Serial Attached Small Computer System Interface (SCSI) expander, a connection between end devices;
receiving, at the (SCSI) expander, an Open Address Frame from an end device that requests a connection through a physical link of the (SCSI) expander that is already servicing the established connection;
determining that the Open Address Frame requests a higher priority connection than the established connection; and
directing one of the end devices utilizing the current connection to terminate the established connection based on the higher priority connection.

13. The method of claim 12, wherein the directing includes:
intercepting, at the (SCSI) expander, an End Of Frame primitive directed to an initiator along the established connection; and
replacing the End Of Frame primitive with a different primitive for transmission to the initiator.

14. The method of claim 13, wherein:
the different primitive comprises an End Of Frame Switch primitive that indicates the higher priority connection has been requested.

15. The method of claim 12, wherein the directing includes:
intercepting, at the (SCSI) expander, an Acknowledge primitive directed to an initiator along the established connection; and
replacing the Acknowledge primitive with a different primitive for transmission to the initiator.

16. The method of claim 15, wherein:
the different primitive comprises an Acknowledge Switch primitive that indicates the higher priority connection has been requested.

17. The method of claim 12, further comprising:
terminating the established connection.

18. The method of claim 17, further comprising:
terminating the established connection by halting issuance of flow credits along the current connection.

19. The method of claim 18, wherein:
halting the issuance of flow credits comprises halting issuance of Receiver Ready (RRDY) primitives.

20. The method of claim 18, further comprising:
initiating the termination of the established connection by transmitting a CREDIT_BLOCKED primitive.

* * * * *